Dec. 28, 1965　　H. J. DURST ETAL　　3,226,512
THERMOSTAT CONTROL WITH SEQUENTIALLY OPERATED SWITCHES
Filed Feb. 24, 1964　　2 Sheets-Sheet 1
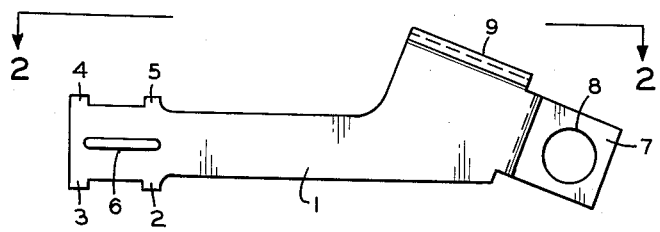
FIG. 1
FIG. 2
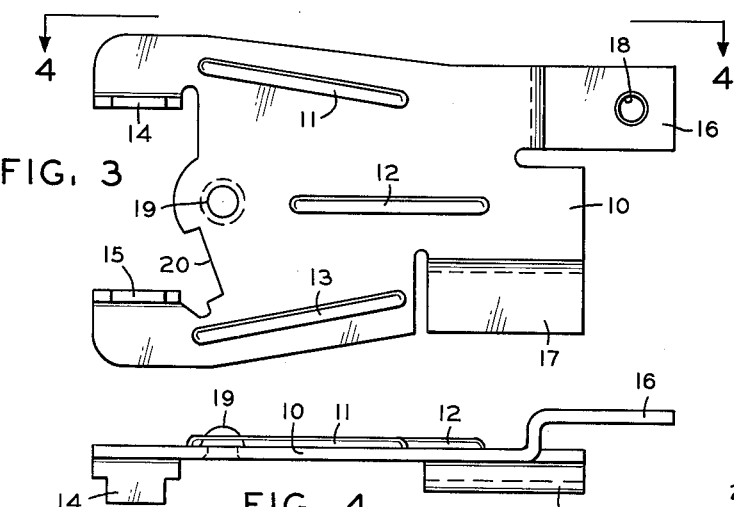
FIG. 3
FIG. 4
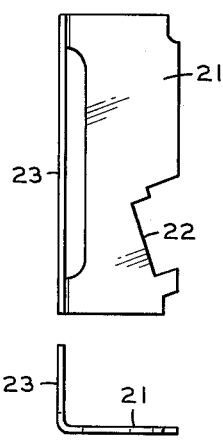
FIG. 5
FIG. 6
FIG. 7
INVENTORS
HENRY J. DURST
JOHN J. THEISS
BY Frank Groom Kirz
ATTORNEY Dec. 28, 1965        H. J. DURST ETAL        3,226,512
THERMOSTAT CONTROL WITH SEQUENTIALLY OPERATED SWITCHES
Filed Feb. 24, 1964        2 Sheets-Sheet 2

INVENTORS
HENRY J. DURST
JOHN J. THEISS
BY *Frank Groom Kirtz*

ATTORNEY

United States Patent Office 3,226,512
Patented Dec. 28, 1965

3,226,512
THERMOSTAT CONTROL WITH SEQUENTIALLY OPERATED SWITCHES
Henry J. Durst and John J. Theiss, St. Louis, Mo., assignors to Diatemp, Inc., St. Louis, Mo., a corporation of Missouri
Filed Feb. 24, 1964, Ser. No. 346,902
5 Claims. (Cl. 200—140)

The principal object of our invention is to provide a dual switch mechanism actuated by a temperature sensitive device and controlled by an adjustable arrangement to provide independent control of devices operating within predetermined temperature ranges.

Another object of my invention is to provide a dual switch or double pole switching mechanism actuated by a temperature sensing device wherein selectively controlled members are operable to vary the temperature range within which a pair of electrical switches will be operative.

Another object of my invention is to provide a dual temperature operated switch mechanism wherein the switches are controlled from a remote temperature sensing device to provide successive actuation of electric switches, dependent on the relative positions of selectively operable control members.

A still further object of our invention resides in the provision therein of a spring-mounted actuating arm which is fixed at one end to a lever member and extending freely therefrom, and which has a contact-actuating portion, the contact-actuating portion being adjustable in position relative to the lever member, so that a simple adjustment procedure serves to set the limits of the temperature range at which the two electrical switches are actuated by the lever member and the spring-mounted actuating arm respectively.

An additional object of the invention is the provision in the same of the means for combining a conventional expansible unit with the device above set forth to actuate one of said pair of electrical switches at either limit of the range of said device.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawing, in which:

FIG. 1 is a top plan view of the spring-mounted actuating arm;

FIG. 2 is a side elevational view, along the line 2—2 of FIG. 1 of the spring-mounted actuatnig arm;

FIG. 3 is a top plan view of the lever;

FIG. 4 is a side elevational view, along the line 4—4 of FIG. 3 of the lever;

FIG. 5 is a top plan view of the hinge member;

FIG. 6 is a side elevational view of the hinge of FIG. 5;

FIG. 7 is a top plan assembly view of the spring-mounted actuating arm of FIG. 1, mounted in position on the lever of FIG. 3, together with the hinge of FIG. 6 and the yoke member;

Figure 8:
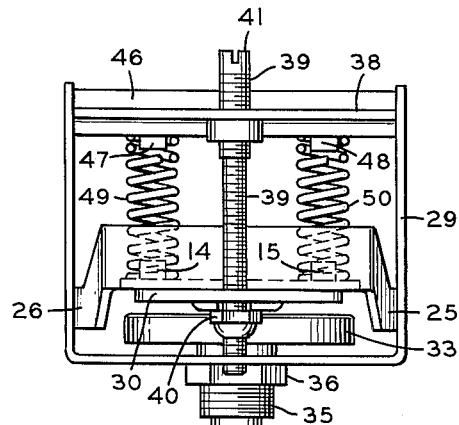
FIG. 8 is a rear elevational view of the entire thermostat showing the rear of the yoke member and its associated assembly of FIG. 7, mounted in the thermostat housing, together with the diaphragm and fluid column tubing.

Before explaining the present invention in detail, it is to be understood that the invention is not limited to its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to FIGURE 1, it will be observed that the numeral 1 is given to our spring-mounted contact actuating arm. This contact actuating arm is stamped from a piece of thin spring steel. At one end it is provided with four retaining lugs, 2, 3, 4 and 5. Between said four retaining lugs is stamped a reinforcing dimple 6, whose purpose is to increase the spring strength of that portion of the actuating arm between the four retaining lugs.

Offset at an angle to the longitudinal axis of the spring mounted arm 1 is contact section or contact end 7. In addition to being canted at an angle to the longitudinal axis of the spring mounted arm 1, the contact end 7 is stepped away or staggered out of the flat plane of the spring mounted arm 1 as shown in FIGURES 1 and 2, so that it is in the form of an L. The L-shaped contact end is provided with a machine screw relief opening or hole 8.

Figure 9:
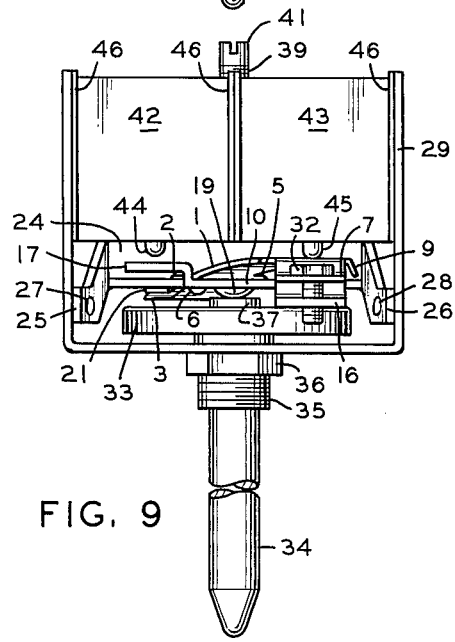
FIG. 9 is a front elevational view of the entire thermostat showing the spring-mounted actuating arm actuating the first of a pair of electrical switches.
Figure 10:
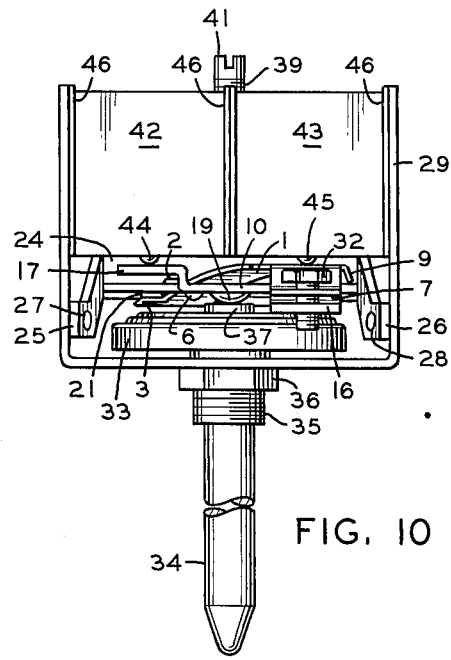
FIG. 10 is another front elevational view of the entire thermostat showing the effect of increase of temperature to the point at which the lever of FIG. 3 is actuating the second of said pair of electrical switches.

In addition the spring-mounted actuating arm 1 is provided with a reinforcing flange 9 parallel to its axis, that is the axis of the contact end 7 and consequently canted at an angle to the longitudinal axis of the contact actuating arm 1. The reinforcing flange 9 is bent at an angle nearly perpendicular to the flat plane of the contact arm 1, as seen in FIGURES 1, 9 and 10.

In FIGURE 3 is shown the lever body 10. Lever body 10 consists of a flat body stamped into the shape shown. First there are three corrugations for strength, 11, 12 and 13. Then bent at an angle perpendicular to the plane of the body 10, are the lower coil spring retaining lugs 14 and 15. Offset from the plane of the lever body 10 are the L-shaped contact end support arm 16 and the L-shaped lever arm 17. The L-shaped contact end support arm 16 and the L-shaped lever arm 17 are located on and project from opposite sides of the lever body 10. This relationship is best shown in FIGURES 9 and 10. It will be noted that the support arm 16 is provided with a threaded machine screw hole 18.

In addition soldered to the surface of one side of the lever body 10 is the pressure contact point 19. Also, rearward of the contact point 19, is the inset 20, forming half of a leaf spring slot.

In FIGURES 5 and 6 is shown the hinge 21. The hinge member 21 is provided with the inset 22 which comprises the other half of the leaf spring slot, which can be seen in the assembly of FIGURE 7. The hinge 21 is bent into and forms an L-shape, having a perpendicular back member 23.

In FIGURE 7 is also shown the yoke 24, which is provided with two projecting arms 25 and 26. Each of the arms 25 and 26 is provided with a pivot pin, 27 and 28, respectively. The pivot pins 27 and 28 are also shown in position in FIGURES 9 and 10. There it will be seen that the yoke 24 is pivoted at its front end upon the pivot pins 27 and 28, which project into the housing 29 of the thermostat, and that the yoke is free to move with respect The rearward portion of the yoke 24 is provided with an integral flange 30. The flange 30 in turn is provided with a hole 31.

In the assembly of FIGURE 7 it will be seen that the yoke 24, the lever body 10 and the hinge 21 are all fastened integrally together, by spot welding or some other such manner. The hinge back member 23 rests flat against the vertical portion of the yoke, and between it and the lever body. In this position the left end of the spring-mounted contact actuating arm 1 is positioned between portions of the hinge member and the lever body. It will be remembered that a slot was formed by joining the two insets, 22 on the hinge 21, and the 20 on the lever body. Together these two insets 20 and 22 form a leaf spring slot. It is in and through this slot that the left end of the actuating arm 1 projects. It will be noted in FIGURE 7 that the retaining lugs 2 and 5 lie on the top surface of the lever body 10, while the lugs 3 and 4 project below. These relative positions can be seen also in FIGURE 9 and FIGURE 10, where not obscured by other parts.

Thus the left end of the leaf spring which is the contact actuating arm 1 is securely held in position between the cooperative insets 20 and 22, and the retaining lugs 2, 3, 4 and 5. The right end of the spring arm 1 is restrained in its movement by the machine screw 32 which is shown in FIGURES 7, 9 and 10. Machine screw 32 has a head which will not pass through the opening 8 on the contact actuating arm 1. The threaded portion of the machine screw 32 however is threadably engaged in the threaded machine screw hole 18 in the L-shaped contact end support arm 16 of FIGURE 3.

In FIGURE 8 is shown the rear view of the entire thermostat assembly. The housing 29 contains and supports the yoke assembly of FIGURE 7. The projecting arms 25, 26 are supported by the pivot pins 27 and 28 through the side walls of the housings 29. A conventional diaphragm assembly is shown to be supported by the housing on its bottom wall. The diaphragm or bellows 33 is an expansible member attached hydraulically to a fluid column contained in the copper tubing 34. The tubing 34 is provided with a conventional collar which is threaded at 35, where it passes through the bottom wall of the housing. By mean of a nut 36, tightened on the threaded collar and against the bottom surface of the bottom wall of the housing, the diaphragm is held in fixed position.

The conventional center stud 37 of the diaphragm contacts the pressure contact point 19 of the lever body 10, which is shown in FIGURES 9 and 10. The tubing 34 of course contains the conventional fluid column which may be of any given length and which is designed to be temperature sensitive. Expansion of the fluid due to an increase in temperature causes the expansible diaphragm 33 to expand from the position of FIGURE 9 to that of FIGURE 10. In so doing it brings increased forces to bear against the pressure contact point 19 by means of the stud 37, which can be seen to have moved from the position of FIGURE 9 to that of FIGURE 10.

Now the rear portion of the yoke assembly is shown in FIGURE 8. There it will be seen that a support bar 38, lies positioned integrally with the housing 29 at the top rear thereof. This support bar 38 carries in a threaded hole therein, a threaded adjusting rod 39. This threaded adjusting rod passes through the support bar 38, down through the hole 31 in the flange 30 on the rear portion of the yoke, and thence down through a nut 40 and thence through a hole in the bottom wall of the housing.

The support bar 38 and the bottom wall cooperate to hold the threaded adjusting rod 39 in position. Turning the adjusting rod by means of the screwdriver slot 41, rotates the rod and raises the relative position of the nut 40 and the flange 30 of the yoke assembly. Also the position of the nut 40 can be varied with pliers or a small wrench to vary the position of the flange 30 of the yoke assembly.

In FIGURES 9 and 10 it will be seen that there are two identical micro switches 42, 43, provided with switch contacts 44, 45 respectively. The microswitches are entirely conventional, and hence are not further illustrated. They are insulated from each other by the cardboard or other insulating material 46. The switches are mounted firmly in fixed positions with respect to the housing 29 by bolts or any similar conventional arrangement.

From the rear view of FIGURE 8, the insulating material 46 hides the switches. However it will also be seen that the support bar is provided with two upper coil spring positioning lugs, 47 and 48. A pair of coil springs 49 and 50 are mounted in position between the upper pair of positioning lugs 47 and 48 on the support bar 38, and the lower pair of positioning lugs 14 and 15 on the lever body 10.

It will be apparent that these coil springs 49 and 50 force down the rearward portion of the yoke assembly and hence serve to hold the pressure contact point 19 against the stud 37 of the diaphragm 33. Thus it will be seen that the yoke assembly is free to pivot at its rearward end which floats free of the housing walls. The front end of the yoke assembly is pivoted by its two projecting arms 25, 26 upon the pivot pins 27, 28 through the housing side walls.

The rearward end of the yoke assembly is constrained in its upward movement by the force of the coil springs bearing down on the lugs 14 and 15 of the yoke assembly. The rearward end is constrained in its downward movement by two effects. The ultimate limit to which the rearward end of the yoke assembly can be forced is chosen by the setting of the position of the nut 40 on the threaded adjusting rod. The nut can be rotated, and thereby raised or lowered on the rod. Then also the stud of the diaphragm 33 constantly bears upward against the pressure contact point 19, in response to variations in temperature, which causes the fluid column in the tube 34 to expand or contract, alternately raising or lowering the stud and hence the contact point 19. The springs 49 and 50 serve to maintain the contact point 19 in engaged relationship with the stud of the diaphragm.

Now in reference to the FIGURE 9, the threaded adjusting rod 39 and the nut 40 have been set so that at a given temperature $T_1$ the right-hand switch 43 is actuated. This actuation is accomplished by the arm 1 pushing upward on the contact 45, pressing it upward. However it will be noted that the contact 44 on the switch 42 had not been touched.

As will be obvious, a drop in temperature to $T_2$ will further lower the stud 37 on the diaphragm 33 and as the column of fluid in the tube 34 contracts, the stud will drop in FIGURE 9 to a position in which the entire yoke assembly will lower and the contact 45 will not be touching the arm 1. The reason is obvious from FIGURE 8; as the temperature goes to $T_2$, a lower temperature, the coil springs 49 and 50 will push down the yoke assembly by bearing down against the lower positioning lugs 14 and 15. This pair of spring forces lowers the rear end of the yoke assembly and keeps the contact point 19 bearing down against the stud 37. Thus at a temperature lower than $T_1$ the contact 45 will not be actuated.

Now consider a rise of temperature to $T_3$. In FIGURE 10 it will be seen that the rise in temperature across the range from $T_1$ to $T_3$ results in raising the free end of the yoke assembly until the L-shaped lever arm 17 actuates the microswitch 42 by pressing the contact 44 of the switch 42.

This action however is not independent of the previous action and it must be noted carefully that the increase of temperature from $T_1$ to $T_3$ has moved the end of the entire yoke assembly, upward against the spring forces of the coil springs 49 and 50 of FIGURE 8.

In FIGURE 10 it will be seen that the diaphragm 33 has expanded considerably. The stud 37 of the diaphragm now is in a much higher position. It has raised the pressure contact point 19 and in so doing has raised the entire yoke assembly. Contact 45 has already been actuated and the further movement upward of the yoke assembly has also raised the L-shaped contact end support arm 16. However the actuating arm 1 is spring mounted. The arm 1 is a leaf spring, held in position at one end by four retaining lugs, two of which 2 and 3 can be seen in FIGURE 10. The front end of the arm 1 is bent into an L-shape. The increase of temperature to $T_3$, the point at which the microswitch 42 is actuated by the L-shaped lever arm 17 against the contact 44, does not further press the contact 45. Contact 45 with its reaction force presses downward and bends the leaf spring so that the arm 1 is moved closer to the L-shaped support arm 16. That is the contact end 7 moves closer to the support arm 16.

In this condition the contact end 7 moves free of the machine screw 32 and of course the entire arm 1 of FIGURE 7 is lowered toward the lever body 10. Now it will be noted that the flange 9 prevents the bending of the leaf spring contact actuating arm 1 from taking place at the free end, that is the end under the contact 45. This end should be relatively rigid so that the point at which the switch 45 actuates is a sharply defined temperature. If the spring arm 1 were easily bent at this end the temperature switching point would be sloppy. With the flange on the leaf spring at 9, this is eliminated as a problem.

However the requirement of the rigidizing flange 9 has the effect of shortening the spring. As a consequence of this we have mounted the spring arm 1 diagonally on the lever body. It is not simply made as long as the lever body; it is made as long as the diagonal, which is a considerable increase in length. The manner of applying the spring also is believed novel. An inset on the edges of both the lever body and the hinge member together form a slot. The spring end with the retaining lugs 3 and 4 is simply slipped into the slot formed and the other end is restrained by inserting the machine screw 32 through the hole 8 in the L-shaped contact end 7 and threading it into the hole 18 in the L-shaped support arm.

For any given range of temperature at which the two switches 42 and 43 are to be actuated, the settings simply consist of adjusting the height of the contact end 7, by adjusting the machine screw 32, and adjusting the entire setting of the yoke assembly by applying a screwdriver to the slot 41 in the threaded adjusting rod 39, While the embodiment of the invention has herein been shown and described, it will be obvious to those skilled in the art that the invention may be variously embodied and that a great many changes, variations, modifications, alterations and arrangements may be made in the construction and arrangements of the parts and elements without departing from the scope of the invention as defined in the appended claims.

We claim:
1. A double pole thermostat consisting of a housing having a pair of side walls and a bottom wall, two microswitches mounted between said side walls and having exposed actuating contacts,
   a support bar mounted between said side walls and above said bottom wall,
   a yoke assembly consisting of a yoke provided with two projecting arms pivoted upon pins projecting into said side walls,
   a lever body integral with said yoke,
   a hinge member mounted between said lever body and said yoke and integral with both,
   a spring-mounted contact-actuating arm disposed diagonally across said lever body, having one end formed into a mounting fixed between said hinge member and said lever body and the other free end positioned to actuate the contact of one of said microswitches,
   an L-shaped lever arm on said lever body to actuate the contact of the other of said microswitches, and
   a diaphragm and tubing assembly mounted on one wall of said housing, said diaphragm movement controlling the position of said yoke assembly to actuate said microswitches in response to changes in temperature.

2. A double pole thermostat consisting of a housing provided with a pair of side walls and a bottom wall, two microswitches mounted upon said walls and having exposed actuating contacts,
   a yoke assembly consisting of a yoke provided with two projecting arms pivoted upon pins projecting into said side walls,
   a lever body integral with said yoke,
   a hinge member mounted between said lever body and said yoke and integral with both,
   a spring-mounted contact actuating arm disposed diagonally across said lever body, having one end fixed between said hinge and said lever body and the other end free to actuate the contact of one of said microswitches,
   an L-shaped lever arm on said lever body to actuate the contact of the other of said microswitches,
   a diaphragm and tubing assembly mounted on one wall of said housing, said diaphragm movement controlling the position of said yoke assembly to actuate said microswitches in response to changes in temperature, and
   an L-shaped contact end support arm on said lever body and an adjustable machine screw mounted on said support arm through said contact-actuating arm to limit the range of motion of said contact-actuating arm.

3. A double pole thermostat consisting of a housing provided with a pair of side walls and a bottom wall, two microswitches mounted upon said walls and having exposed actuating contacts,
   a yoke assembly consisting of a yoke provided with two projecting arms pivoted upon pins projecting into said side walls,
   a lever body integral with said yoke and provided with a pair of coil spring positioning lugs,
   a hinge member mounted between said lever body and said yoke and integral with both,
   a pair of insets, one on said hinge member and one on said lever body, together forming a slot,
   a spring-mounted contact actuating arm, disposed diagonally across said lever body, having one end provided with four retaining lugs and disposed in said slot between said hinge member and said lever body, and the other end free to actuate the contact of one of said microswitches,
   an L-shaped lever on said lever body to actuate the contact of the other of said microswitches,
   a support bar mounted between said side walls and provided with a pair of coil spring positioning lugs,
   a pair of coil springs mounted between the positioning lugs on said support bar and the positioning lugs on said lever body,
   a diaphragm and tubing assembly mounted on one wall of said housing, said diaphragm movement controlling the position of said yoke assembly and the movement of said assembly upward against the pair of coil springs, to actuate said microswitches in response to changes in temperature, and
   an L-shaped contact end support arm on said lever body and an adjustable machine screw mounted on said support arm through said contact-actuating arm to limit the range of motion of said contact-actuating arm.

4. A double pole thermostat consisting of a housing provided with a pair of side walls and a bottom wall, two microswitches mounted upon said walls and having exposed actuating contacts,
   a yoke assembly consisting of a yoke provided with two projecting arms pivotally mounted upon said side walls of said housing, a lever body integral with said yoke and provided with a pair of coil spring positioning lugs, a hinge member mounted between said lever body and said yoke and integral with both, a pair of insets, one on said hinge member and one on said lever body, together forming a spring slot, a contact actuating arm, in the form of a leaf spring mounted diagonally across said lever body, having one end provided with four retaining lugs and disposed in said spring slot between said hinge and said lever body, and the other end disposed under and actuating the contact of one of said microswitches, an L-shaped lever on said lever body to actuate the contact of the other of said microswitches, a support bar mounted between said side walls and provided with a pair of coil spring positioning lugs, a pair of coil springs mounted between the positioning lugs on said support bar and the positioning lugs on said lever body, an adjusting screw mounted on said support bar and said bottom wall of said housing and passing through said yoke assembly to control the positioning limit of the movement of said yoke assembly, a diaphragm and tubing assembly mounted on one wall of said housing, said diaphragm mounted against the lower side of said yoke assembly, to move said yoke assembly upward against said coil springs and actuate said microswitches in response to changes in temperature, an L-shaped contact end support arm on said lever body, and an adjustable machine screw mounted on said support arm through said contact-actuating arm to limit the range of motion of said contact-actuating arm.

5. The combination of claim 4, and further characterized by a rigidizing flange on the free end of said contact-actuating arm, canted at an angle to the longitudinal axis of said arm and bent perpendicular to the plane of said arm.

References Cited by the Examiner

UNITED STATES PATENTS 2,394,714  2/1946  Newton _____ 200—83 X
2,578,340  12/1951 De Lancy _____ 200—140

FOREIGN PATENTS 829,815  3/1960  Great Britain.

BERNARD A. GILHEANY, *Primary Examiner.*

H. M. FLECK, *Assistant Examiner.*